US008275378B2

(12) United States Patent
Venkatachalam

(10) Patent No.: US 8,275,378 B2
(45) Date of Patent: Sep. 25, 2012

(54) HANDOVER FOR CELLULAR RADIO COMMUNICATIONS

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 12/646,718

(22) Filed: Dec. 23, 2009

(65) Prior Publication Data

US 2011/0002299 A1 Jan. 6, 2011

Related U.S. Application Data

(60) Provisional application No. 61/223,360, filed on Jul. 6, 2009.

(51) Int. Cl.
*H04W 4/00* (2009.01)
*H04W 36/00* (2009.01)

(52) U.S. Cl. .................. 455/436; 455/435.1; 455/435.2; 455/438; 370/331

(58) Field of Classification Search .... 455/432.1–432.3, 455/435.1–435.3, 436–446, 450, 509, 524–525, 455/552.1, 556.1, 560–561, 433–434, 550.1, 455/556.2; 370/328–329, 331–333, 338, 370/341
See application file for complete search history.

(56) References Cited

U.S. PATENT DOCUMENTS

| 6,539,225 | B1* | 3/2003 | Lee ................................. | 455/436 |
|---|---|---|---|---|
| 7,266,101 | B2* | 9/2007 | Dorenbosch ................... | 370/331 |
| 7,539,138 | B2* | 5/2009 | Maenpaa ....................... | 370/235 |
| 7,567,538 | B2* | 7/2009 | Kallio ............................ | 370/338 |
| 7,649,866 | B2* | 1/2010 | Chari et al. .................... | 370/331 |
| 7,912,009 | B2* | 3/2011 | Sayeedi et al. ................. | 370/331 |
| 2005/0010692 | A1 | 1/2005 | Jain et al. | |
| 2005/0130654 | A1 | 6/2005 | Claudio et al. | |
| 2005/0272424 | A1 | 12/2005 | Gallagher et al. | |
| 2008/0160997 | A1* | 7/2008 | Kim .............................. | 455/433 |
| 2008/0261565 | A1 | 10/2008 | Kunz et al. | |
| 2010/0124200 | A1* | 5/2010 | Ergen et al. .................... | 370/331 |
| 2010/0234025 | A1* | 9/2010 | Julka ............................. | 455/436 |

OTHER PUBLICATIONS

PCT Search Report, PCT/US2010/041053, International Filing Date Jul. 6, 2010.

* cited by examiner

*Primary Examiner* — Meless Zewdu
(74) *Attorney, Agent, or Firm* — Blakely, Sokoloff, Taylor & Zafman LLP

(57) ABSTRACT

An improved handover process is described for a cellular wireless network. In one example, a method includes registering a mobile station to a first base station and a first gateway, handing the mobile station over to a second base station coupled to the first gateway, selecting a second gateway coupled to the mobile station, registering the mobile station to the second gateway, de-registering the mobile station from the first gateway, and handing the mobile station over to a third base station coupled to the second gateway and not coupled to the first gateway.

20 Claims, 7 Drawing Sheets

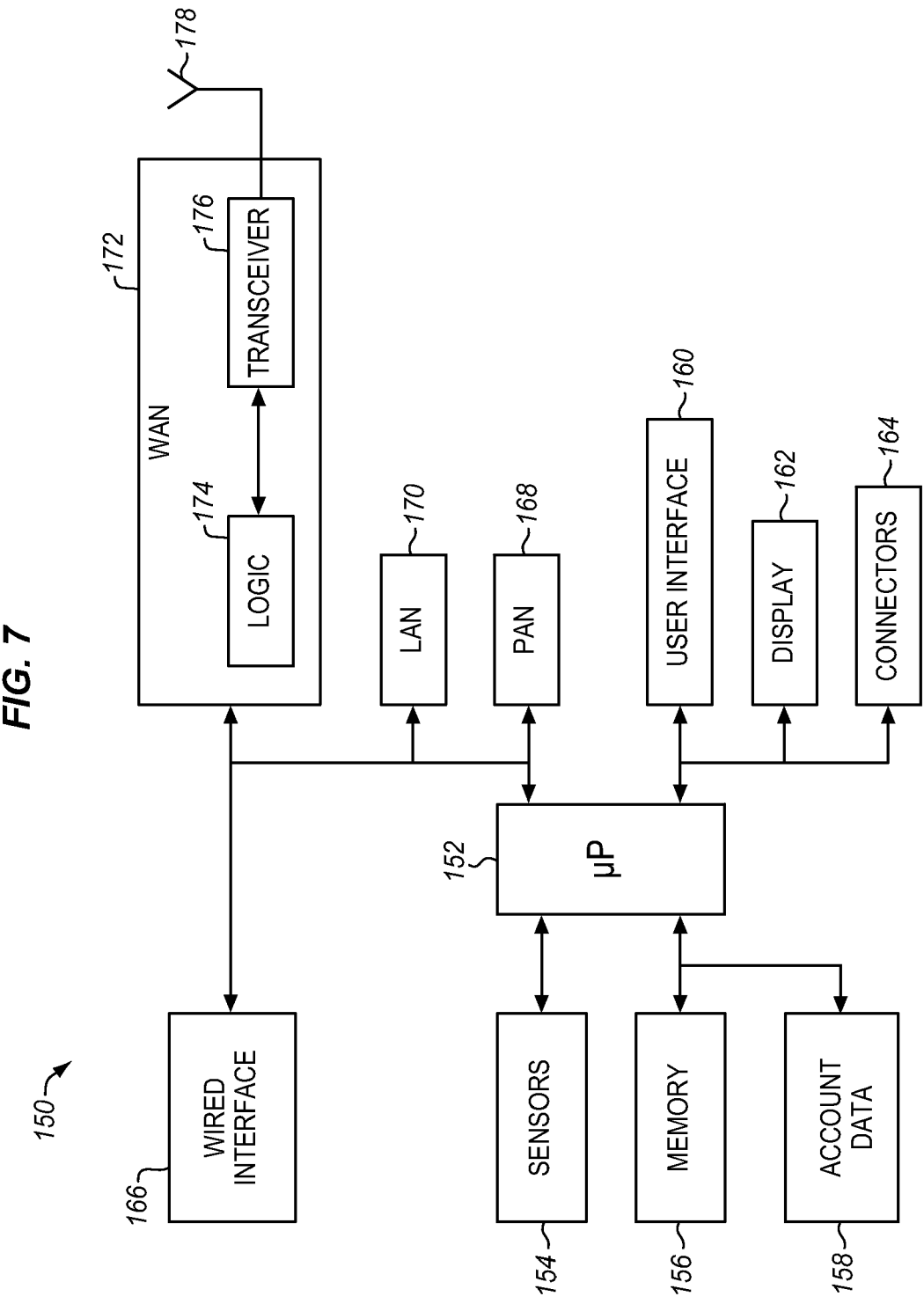

HANDOVER FOR CELLULAR RADIO COMMUNICATIONS

CROSS-REFERENCE TO RELATED APPLICATIONS

The present application claims the priority of provisional application Ser. No. 61/223,360, filed Jul. 6, 2009, entitled Advanced Wireless Communications Systems and Methods.

FIELD

The present description pertains to the field of handover for wireless communications and, in particular, to handing over communications from one cluster or controlling group to another.

BACKGROUND

In a cellular communications system, base stations are used to serve the devices of mobile user with data, voice and other services. Each base station has a limited range so that when a user moves to far away from a base station, the connection with that base station must be handed over or handed off to a different base station that is closer to the user. This allows the base stations and the user devices to use lower power. To provide the handovers, elaborate processes have been developed to transfer the connections.

Each base station is typically also connected to some upstream equipment that is, in turn, connected to the telephone network, the Internet and other data sources. This upstream equipment has high speed data paths to the base stations that it serves and is normally limited to some number of base stations. When the mobile user goes beyond this group of base stations, the connection can be lost or some more complicated set of data connections must be used.

In a broadband wireless network, such as a WiMAX or 3GPP LTE (Third Generation Partnership Project Long Term Evolution) network, each base station is coupled to a gateway and the gateways all are assigned to a particular cluster. When the mobile user moves to a base station that is outside the cluster or is not directly connected to the same gateway, then the data for the mobile user must be passed from one gateway to another to reach the user. In order to support many users moving around among many gateways, the connections between gateways must be built to carry a large amount of data traffic from the users. This can delay the data in reaching the user. In order to quickly transfer all the user data between gateways the gateways and their connection must are made more expensive.

BRIEF DESCRIPTION OF THE DRAWINGS

Embodiments of the present invention are illustrated by way of example, and not limitation, in the figures of the accompanying drawings in which like reference numbers are used to refer to like features, and in which:

FIG. 7 is a block diagram of a radio terminal or station according to an embodiment of the invention.

DETAILED DESCRIPTION

Clusters of a cellular wireless communications system, such as a WiMAX access network, can be overlapped to reduce the effects of anchoring and significantly simplify the end-to-end (E2E) operation of handover and other network operations. The overlapping clusters can also simplify the cellular network architecture and handovers as a result.

In the example of a WiMAX network, anchoring" on the R4 interface can be eliminated. Anchoring negatively impacts network deployments. It increases complexity and renders interoperability murky, thereby leading to poor performance in some mobility scenarios. As described below, costs can be reduced and performance improved.

Figure 1:
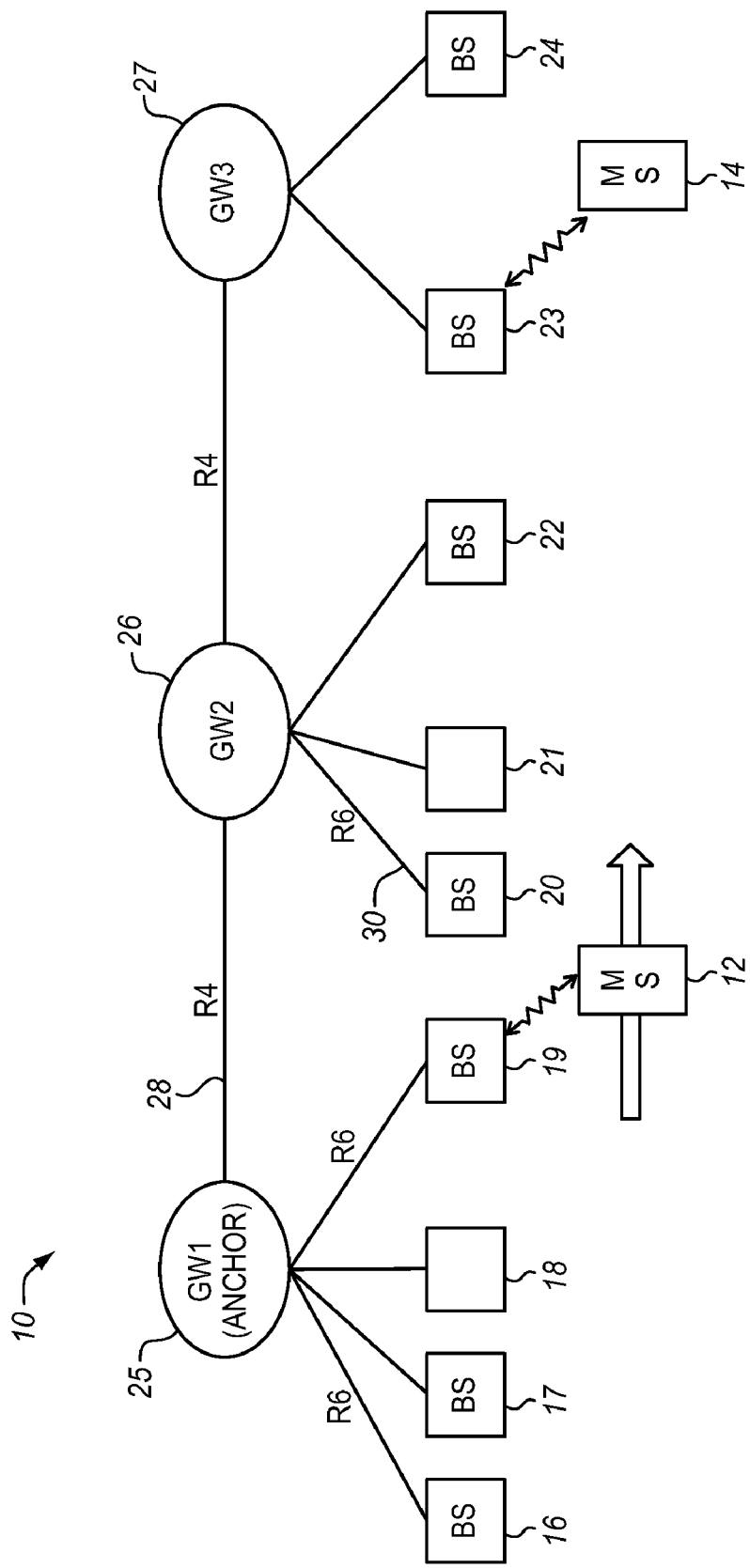
FIG. 1 is a block diagram of a wireless network architecture with gateways to which embodiments of the present invention can be applied.

FIG. 1 shows an example of a cellular radio system 10. MS (mobile station) 12, 14 can be mobile or fixed and can take the form of cellular telephones, netbooks, personal computers, media players, appliances, or any of a variety of other wireless connected devices. The MS can also be referred to as a subscriber station, remote station, terminal or by other terms.

A number of base stations (BS) 16-24 are provided in the system to provide connections for the MS. The BS can take a variety of different forms and may cover large or small areas and transmit powers, depending on the application. While the BSs are shown as being similar in FIG. 1, they may be connected and configured differently from each other as well. In some applications, a network access point or an MS peer may act or function as a BS. In the illustrated example, the first MS is registered with a BS 19 and the second MS is registered with another BS 23. This registration allows each MS to communicate with the BS to support all of the services that the MS and the system support.

Each BS 16-24 is connected to a gateway (GW) or base station controller. In the case of WiMAX, the base station controllers are referred to as ASN-GW (Access Service Network-Gateway). There are three gateways 25, 26, 27. Each gateway supports several BS. The gateways may or may not be connected to each other and are all connected directly or indirectly to a Mobile Telephony Switching Center (MTSC) (not shown). There may be one or more MTSC's in any one system. The MTSC is coupled to a telephony backbone that provides access to other telephony systems, data servers and services and more. In some instances, a BS may be connected directly to the MTSC through the backbone instead of through a gateway.

In the illustrated example, system administration and management can be distributed between the BS, GW, and MTSC in a variety of different ways. For communications, the first MS 12 can communicate with the second MS through the respective connected BS and GW. If both MS were registered at the same BS, the BS may be able to support communications without routing through the GW. Similarly, if the second MS were connected to another system, MTSC or ISP (Internet Service Provider), then the two MS can communicate through the backbone.

FIG. 1 shows one example network, however, the present invention can be applied to a wide range of different network configurations and communications can be routed differently to suit different situations and applications. The diagram of FIG. 1 represents a single Access Service Network (ASN). Each ASN may have several, even hundreds of BS and GWs. A BS is connected to a fixed GW using an R6 interface.

FIG. 1 shows an example of an MS 12 connected to BS 19. It is moving to the right in the diagram toward the next BS 20. The second BS 20 is connected to GW2 26. When the MS moves from the first BS, connected to GW1, to the second BS, connected to GW2, then there will be a handover of the MS from the first BS to the second BS. During handover, the data path of this MS is anchored in GW1 through the first BS. In order to maintain the connection to the MS during handover, the connection to GW1 goes across to GW2 via an R4 interface 28 between the two GWs. It continues then onto the second BS 20 via an R6 interface 30 between GW2 and the BS.

The data path for the MS will continue through the R4 interface from GW2 to GW3 as long as the MS remains anchored to the first gateway GW 1. As the MS travels farther from GW1, the data path becomes more complex, longer and slower. If there are many MSs in the network, then the capacity of the R4 connections must be adapted to serve all of the MSs that are anchored at gateways that are far away. As a result, anchoring adds some complexity to the network and can cause interoperability test (JOT) issues in the network.

In order to simplify this data path, the anchor GW for the MS must be changed to GW1 68. This is done by a home agent (HA) 94 for the CSN (Connectivity Services Network) (not shown). It is a separate process with high latency that is typically initiated by the HA. The HA is connected to all of the GWs and manages traffic between the networks of FIGS. 1, 2, 3, and 4 and outside networks.

Figure 2:
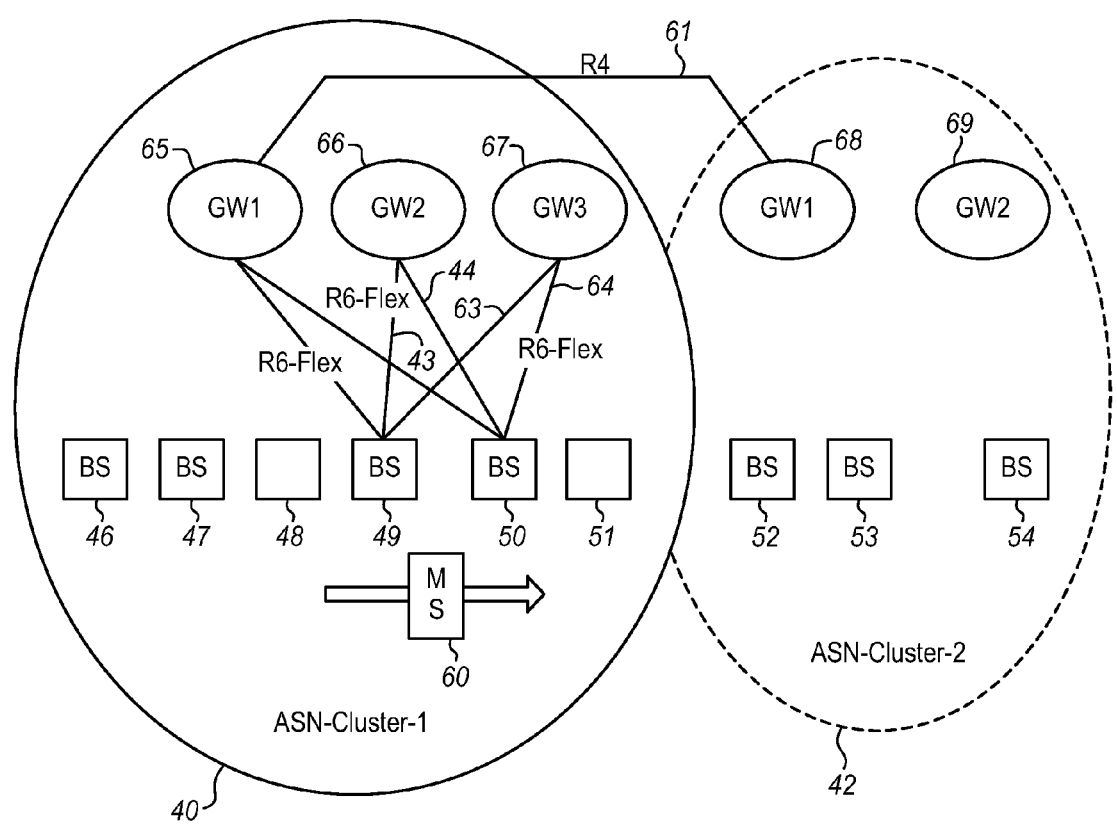
FIG. 2 is a block diagram of a wireless network architecture with Access Service Network cluster to which embodiments of the invention can be applied.

FIG. 2 shows another example of a cellular radio system. In this example, the ASN has been divided into two different ASN clusters 40, 42. An MS 60 in the first cluster 40 is connected to a BS 49. A number of base stations (BS) 46-54 are provided in the two ASN clusters to provide connections for the MS. A first group of BSs 46-51 are provided in the first ASN cluster 40 and a second group of BSs 52-54 are provided in the second ASN cluster 42.

Each BS in the first group 46-51 is connected to multiple GWs. In the illustrated example, three GWs 65, 66, 67 are each coupled to each of two BSs through an R6-Flex interface. GW2 has connections 43, 44 to multiple BSs, and GW3 similarly has connections 63, 64 to the same BSs. Similar connections can be made with the other BSs, but are not shown in order to simplify the drawing. The gateways may or may not be connected to each other and this connection is not shown in order to simplify the drawing. As in FIG. 1, the GWs are all connected directly or indirectly to one or more MTSCs or similar controlling stations (not shown). As in FIG. 1, each ASN may have several, even hundreds of BSs and GWs. Each GW may have several or hundreds of BSs. Only a few are shown in order to simplify the drawing. Similarly, there may be many ASN clusters in a single ASN.

In the illustrated example, each ASN consists of several clusters. Each cluster contains several GWs and BSs. Any BS within a cluster can connect directly to any GW within the cluster using the R6-flex interface. Using this architecture, as long as an MS moves between different BSs of the same cluster, it can maintain a direct connection to a single GW.

Because of the direct connection, no data needs to be transmitted between GWs over the R4 connection of FIG. 1. The target BS in a handover can connect back to the same GW that the serving BS was connected to for this MS. In FIG. 2, the MS is initially connected to a serving BS 49 which is connected to a GW, for example GW1 65. After the handover, the MS will be connected to a target BS 50 which is also connected to GW1. As long as the MS stays within the cluster, there is no need for data traffic to be communicated between gateways.

However, if the MS continues to travel to the right in the diagram, then it will cross into the next cluster 42. In that case, it will be handed over to a BS 52, 53, 54 in the second cluster 42. These BSs are connected with R6-Flex to the GWs in the same cluster 68, 69. Since R6-Flex does not cross the cluster boundary in the ASN, the MS can no longer connect directly to its anchor GW as it could when being handed over in the other cluster. This is a limitation of R6-Flex in order to manage the complexity of all of the connections that can occur between BSs and GWs.

To support the MS in the second cluster while it is anchored to a GW in the first cluster an R4 connection 61 between the two GWs 65, 68 can be used. The data path of this MS 60 is anchored in the GW 65 of the old cluster 40 and data is forwarded to the new GW 68 in the new cluster 42 using the R4 interface 61. The result is similar to the R4 connection shown in FIG. 1. Accordingly, clustering allows the system to avoid using the R4 links between GWs as long as the BS stays within a cluster. There can be many more R4 links. Only one is shown to simplify the drawing. Once the BS moves to another cluster, the results are the same as for FIG. 1, but with the added complexity of R6-Flex.

The use of the connections between GWs can be reduced by introducing some overlap between the clusters. Two clusters can overlap by having one or more common BSs, GWs. In other words by making one or more BSs or GWs present in both clusters, efficiency is improved.

Figure 3:
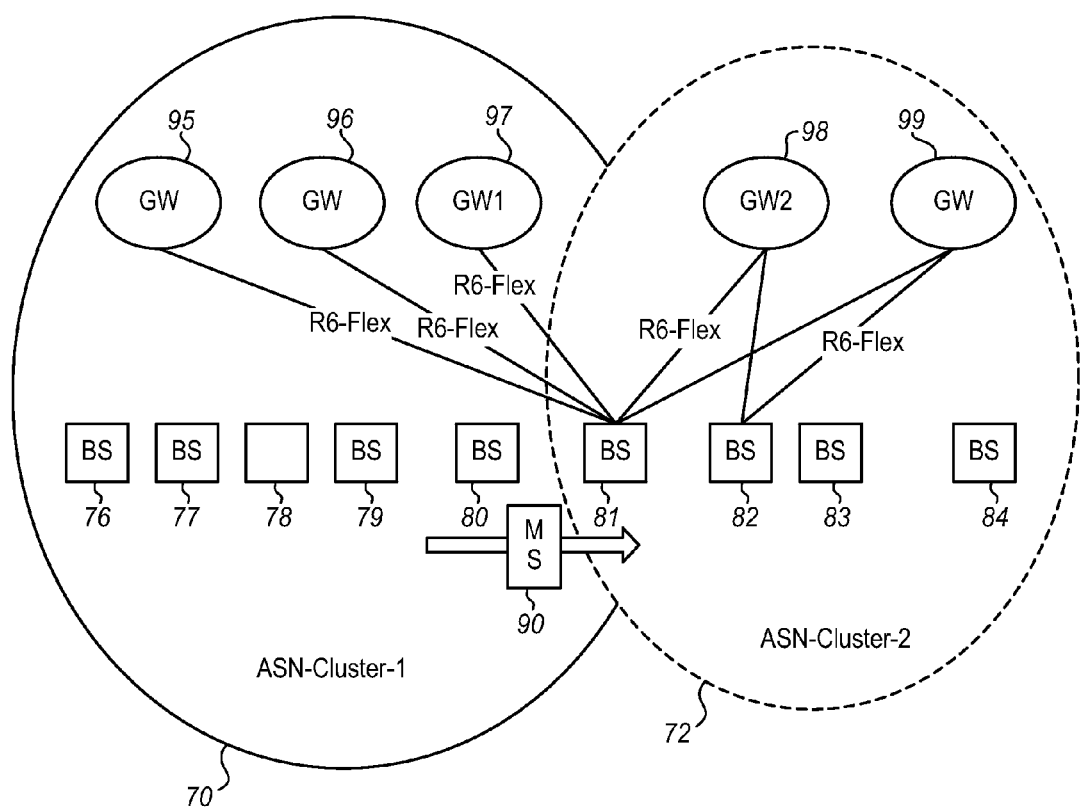
FIG. 3 is a block diagram of a wireless network architecture with Access Service Network clusters that share a base station according to an embodiment of the invention.

FIG. 3 shows an example in which one BS 81 appears in two different ASN clusters 70, 72. An MS 90 in the first cluster 70 is connected to a first BS 81. A number of base stations (BS) 76-84 are provided in the two ASN clusters to provide connections for the MS. A first group of BSs 76-81 are provided in the first ASN cluster 70 and a second group of BSs 81-84 are provided in the second ASN cluster 72. As mentioned, BS 81 is in both clusters.

Each BS in the first group 76-81 is connected to multiple GWs. In the illustrated example, three GWs 95, 96, 97 are each coupled to the shared BS 81 an R6-Flex interface. Similar connections can be made with the other BSs, but are not shown in order to simplify the drawing. The gateways may or may not be connected to each other and this connection is not shown in order to simplify the drawing.

Similarly, the second cluster 72 has three four BSs 81, 82, 83, 84 and these are coupled to each of the GWs 98, 99 through an R6-Flex connection. As can be seen in the figure, the common BS 81 has direct R6-Flex connections to GWs in both clusters. In the illustrated example, there is a direct connection from the common BS to every GW in each cluster. However, the other BSs can be limited only to connections to GW within the same cluster.

Using this architecture, the MS can move between different BSs of the first cluster and maintain a direct connection to its anchor GW. In this example, the MS has moved to the right hand side of the first cluster 70 and is connected to the right-most BS 81 of the first cluster. The anchor GW is the right-most GW 97, although it could be any other GW in the cluster.

Because of the direct connection, no data needs to be transmitted between GWs over an R4 or any other type of connection in order to serve the MS from the common BS 81.

The target BS in a handover can connect back to the same GW that the serving BS was connected to for this MS.

When the MS moves to the common BS 81, then the BS can switch its affiliation for that MS from the MSs anchor GW1 97 in the first cluster 70 to a different gateway, such as GW2 98 in the second cluster 72. This can be done after the handover to the BS is completed and before a handover to a BS that is only within the second cluster. Since the MS will likely be using the common BS for some time, the switch from on GW to another can be done more slowly as a background process.

After the change of GWs, when the MS moves from the common BS 81 to a different BS, for example, BS 82 in the second cluster 72, the new target BS can still connect to the new anchor GW 98. Since the target BS and the new anchor GW are both in the same cluster, a direct connection using R6-flex can be made. Subsequent handovers to other BSs within the second cluster can be handled as in FIG. 1. With this process, strict anchoring at any of the GWs is eliminated. Instead of anchoring, a more flexible, changeable association with a GW is made.

Figure 4:
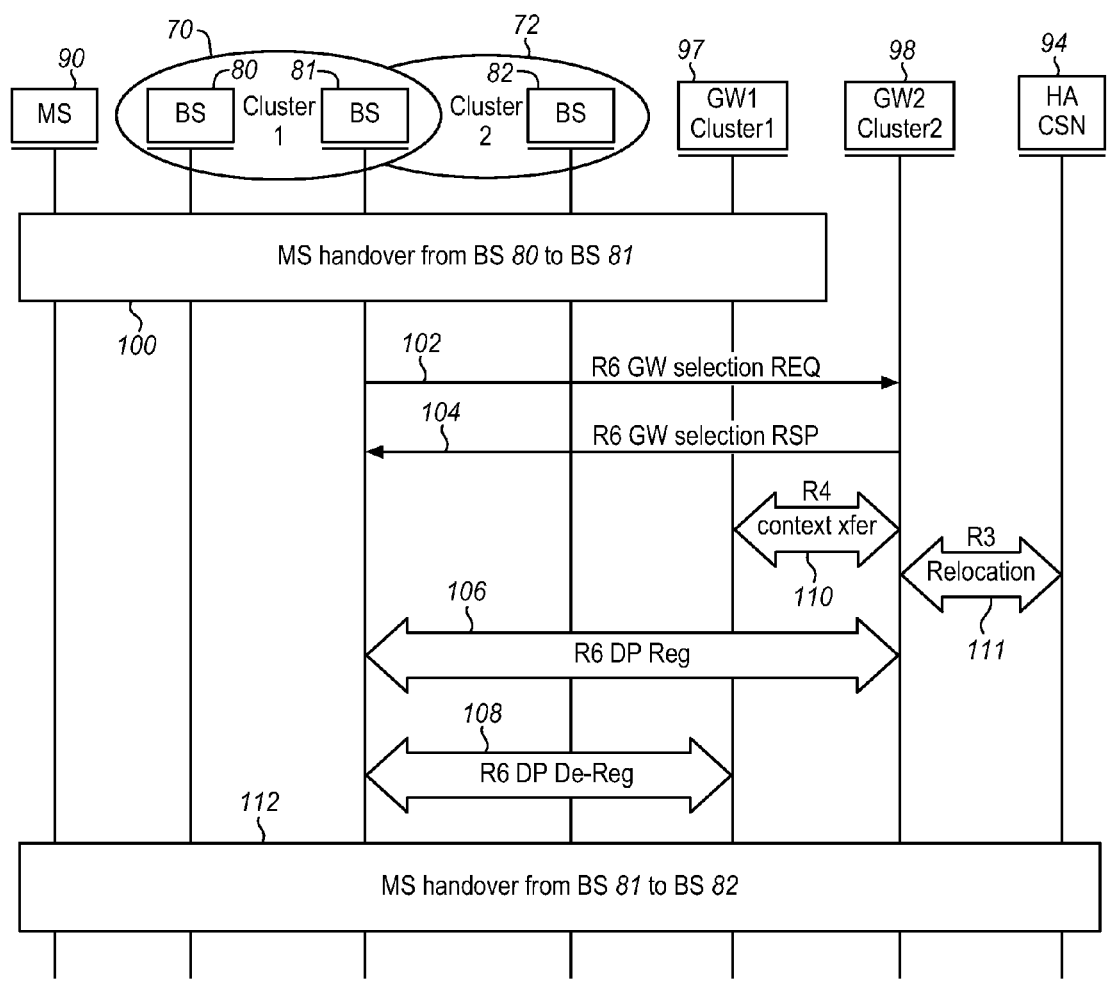
FIG. 4 is a signaling diagram of transferring a mobile station from one cluster to another according to an embodiment of the invention.

FIG. 4 shows a message exchange that can be used to perform a handover as described in the context of FIG. 3. Each of the stations or terminals is identified across the top of the diagram and the messages are sent between terminals in the order shown from top to bottom. The process begins with a handover of an MS from BS 80 to BS 81. This is indicated generally as block 100. This can be done in any of a variety of ways. The standards for WiMAX and other wireless protocols specify a particular protocol that can be used to perform such a handover. After the handover, the MS is connected to the common BS that is connected through R6-Flex to GW in both clusters.

Having accomplished the first handover, first a new target GW is selected and notified. Then the data path to the MS is changed from the originating GW to the target GW. Finally, there is a context transfer from the originating GW to the target GW. This completes the transfer in a WiMAX context. For other types of communication systems, different operations may be used or required in order to transfer the connection from the one GW to the other.

The connection from the BS to the GW can now be switched from the first cluster 70, from the MS came to the second cluster 72 to which the MS is headed. First, the BS 81 sends a selection request 102 to the target GW 98 through its R6 connection. This message can be a GW selection REQ message. The message indicates the target GW and probably the originating GW. The target GW will respond through the same R6 connection with a GW selection RSP message 104 to the BS 81. When the MS has established the communication with the target GW, then the originating GW can transfer its context 110 directly to the target GW 98.

At this point, or at a later time, the HA 94, can move 111 the connection between the GW and the serving BS from the originating gateway to the target gateway. This also moves the R3 connection between the HA and the GW from the originating GW to the target GW. Therefore, in this example, it can be referred to as an R3 relocation. With the connection relocated, it is no longer necessary to use the R4 connection between GWs.

Having established communications between the BS and the target GW, a data path registration 106 can be performed. In WiMAX, this can be an R6 DP Reg process. This process connects the BS to the target GW for data communications. In effect, it establishes the target GW as the anchor GW for the MS. At the same time or shortly thereafter, the BS cancels the data path registration with the originating GW 97. This is indicated as an R6 DP De-Reg 108 in the FIG. 4.

As a result of this process, only the context is transferred through the R4 connection. All other communications and data transfers are through the R6 interfaces. After the context is transferred and the registration has been moved to the target GW, the MS can communicate directly through the R6-Flex connection through the target gateway. Since the BS is always registered to one or both of the GWs, the MS is always able to communicate through one or both of the GWs. The movement from one cluster to another does not impact the MS.

After the MS has been completely transferred to the second cluster, it can be handed over to any other BS in the second cluster. In the illustrated example, there is then a handover 112 from the common BS 81 to a BS that is only in the second cluster 72.

The registrations and de-registration are typically only applicable to the MS that is being handed over. The BS may continue to server MSs through GWs in both clusters without any change of GW or cluster. The GW selection REQ message 102, RSP message 104, DP Reg 106, and DP De-Reg 108 can include identifications of the MS 90 for which the data path is to be changed. To support the change in data path and registration, account information, subscription information, and other attributes of the MS can be checked to ensure that it is authorized or licensed to operate in the second cluster.

Before the protocol of FIG. 4 is conducted, it can be determined whether the MS will be requiring a handover into the second cluster after the handover to the common BS. If the MS is likely to remain within range of the first cluster, then the change in data path registration can be avoided. Such a determination can be made by the MS, BS, GW or a management or control system connected to the system but not shown in the drawing figures. The best way to form the determination can be adapted to suit any particular application.

One way to predict the next likely handover for the MS is to estimate the speed and direction of travel of the MS and then compare that to the radio range of the base stations that are nearby. Such an estimate can be made directly, using a positioning system on the MS or indirectly, for example, by measuring received signal strengths, for example RSSI (Received Signal Strength Indication) either at the MS or at several BSs. Alternatively, a separate location and travel prediction system can be used to monitor the MS and predict whether it will require a handover, and if so when and where.

Figure 5:
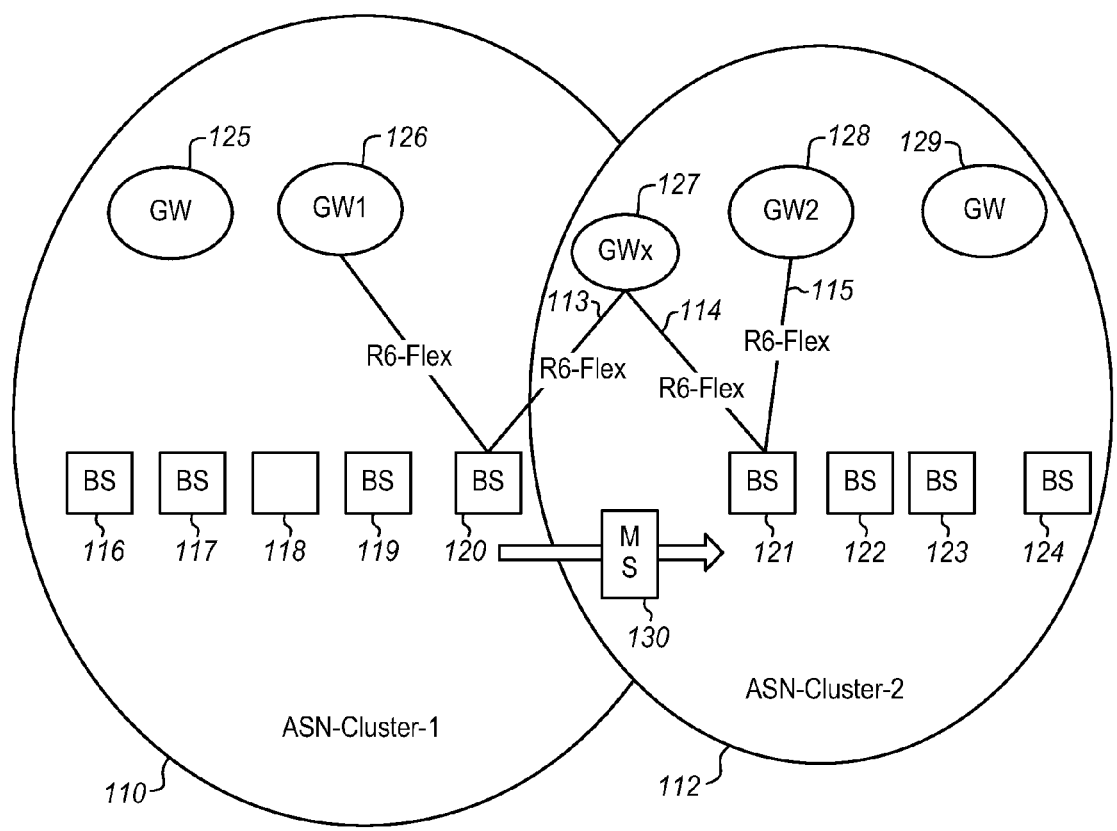
FIG. 5 is a block diagram of a wireless network architecture with Access Service Network clusters that share a gateway according to an embodiment of the invention.

In the example of FIG. 5, two clusters overlap by sharing at least one GW. As the MS moves toward the boundary of the serving-cluster, the data path is relocated to a GW that overlaps the serving cluster and the target cluster. When inter-cluster handover happens, anchoring is not required, since the data path is already anchored at a GW that is common to both clusters. For further load balancing, a GW relocation can be done at a later point in time.

Considered in more detail, there is a first cluster 110 and a second cluster 112. An MS 130 in the first cluster 110 is connected to a first BS 120. A number of base stations (BS) 116-124 are provided in the two ASN clusters to provide connections for the MS. A first group of BSs 116-120 are provided in the first ASN cluster 110 and a second group of BSs 121-124 are provided in the second ASN cluster 112. In contrast to FIG. 3, there is no common BS. Each BS is restricted to a particular cluster.

Each BS in the first group 116-120 is connected to multiple GWs. In the illustrated example, three GWs 125, 126, 127 are each coupled to a BS 120 at the edge of the cluster through an R6-Flex interface. Similar connections can be made with the other BSs, but are not shown in order to simplify the drawing. The gateways may or may not be connected to each other and this connection is not shown in order to simplify the drawing.

Similarly, the second cluster 112 has three BSs 121, 122, 123, 124 and these are coupled to each of the GWs 127, 128, 129 through an R6-Flex connection. As can be seen in the figure, the common GW 127 has direct R6-Flex connections to BSs in both clusters. In the illustrated example, there is a direct connection 113, 114 from the common GW to only one BS in each cluster. However, the GW may be connected to more than one BS in each cluster or to all BSs.

Using this architecture, the MS can move between different BSs of the first cluster and maintain a direct connection to its anchor GW. In this example, the MS has moved to the right hand side of the first cluster 110 and is connected to the right-most BS 120 of the first cluster. The anchor GW is the right most GW 127, although it could be any other GW in the cluster.

In order to move to a BS 121 in the neighboring cluster 112, the MS can perform a handover to the target BS. Since this BS is also directly coupled to the anchor GW 127, the R6-Flex connection to the anchor gateway can be maintained. In order to progress further into the second cluster the MS can transfer to a GW 128 of the second cluster. Using a direct connection 115 between the serving BS 121 and a target GW, the change can be made without any impact on service for the MS. Once transferred to a GW within the second cluster, there can be handovers to any of the BS within that cluster without any effect on communications and without using the R4 connections between the GW.

Figure 6:
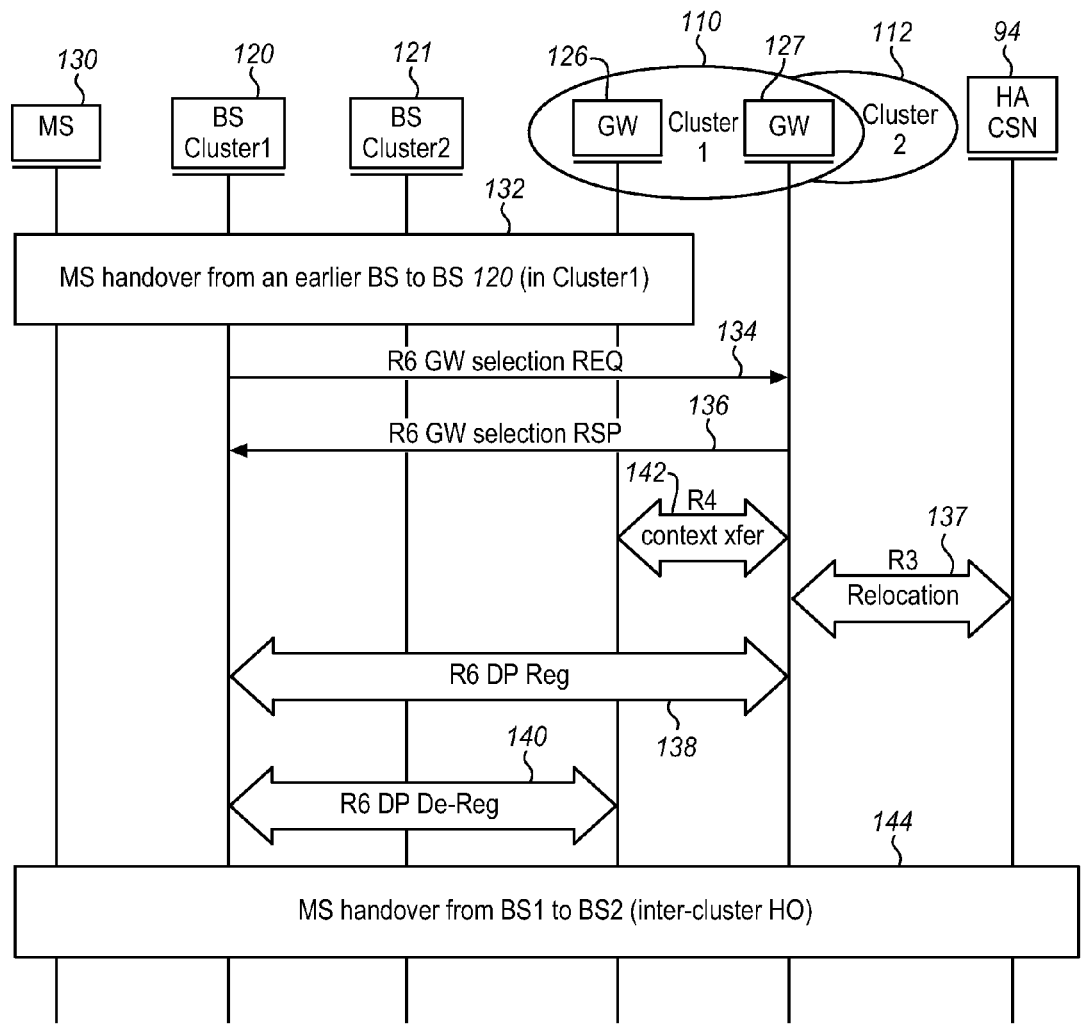
FIG. 6 is a signaling diagram of transferring a mobile station from one cluster to another according to another embodiment of the invention.

FIG. 6 is a call flow procedure to support the handover process explained above in the context of FIG. 5. First, the MS is handed over to reach a BS on the edge of its cluster, such as BS 120 in FIG. 5. This is indicated in brief as block 132. While such an operation typically involves many steps and many signals, these are not shown in order to simplify the diagram. The BS 120 that is serving the MS 130 is coupled, in this example, by a data path through a GW 126 in the originating cluster, the first cluster 110. Upon determining that the MS will be moving to the second cluster 112, the BS can start a process or protocol to transfer service of the MS to the second cluster.

To begin, the BS sends a selection request 134 to the common GW 127. The common GW then sends a response 136 back to the BS. When this done, a context transfer 142 is made from the originating GW to the target GW. At this or another time, the HA 94 can also relocate the R3 connection 137 from the originating GW to the target GW.

The BS and common GW can then perform a registration 138 to register the MS with the common GW. This can be done for example with a DP Reg process. After this is completed, the BS can de-register the MS from the originating GW 126, using, for example, a DP De-Reg 140. The MS is now registered with a GW in the next cluster.

As the MS moves further into the second cluster 112 and away from the first cluster 110, it can be handed over 144 to other BSs in the second cluster. If these BSs are connected to the target GW, then no further GW transfers are required. At any time after the context transfer 142 from the second cluster GW to the common GW, the system can assign the MS to a different GW. This can be done to support more BSs in the second cluster or for load balancing. The process to transfer the MS to another GW can be similar to that shown in FIG. 6 with messages 134, 136, 138, 140, and 142.

For even greater flexibility, two neighboring clusters can be configured to share both GWs and BSs. In such an example, there will be at least one BS and GW that are common to two clusters. The operations for moving a MS from one cluster to another will be similar to those described above. Either or both operations as shown in FIGS. 4 and 6 can be used, depending on the particular circumstances.

FIG. 7 shows an example of a hardware configuration that can be used for both a base station and a mobile station to implement the communications described above. In FIG. 7, the station 150 is driven by a processor 152. This can be a small, low power processor in the case of a MS or a high power, high-speed processor in the case of a BS.

The processor has a memory bus that is coupled to a memory 156, such as magnetic, optical, or solid state memory or some combination thereof. The memory contains programming instructions and user data that can be sent and received between stations. Account data 158 can also be connected to the bus. For the MS, this can include a SIM (Subscriber Identity Module) and other stored personal parameters. For the BS this can include account authorization databases or connections to such databases.

A suite of sensors 154, such as positioning sensors, battery or power sensors, cameras and microphones, and transceiver signal sensors are coupled to the processor to provide additional data to the processor.

A user interface bus, such as USB (Universal Serial Bus) or another type of user interface connection connects the processor to a user interface 160, such as a keyboard, touch screen, mouse, trackball, or other interface, a display 162, and other connectors 164 to allow other devices to be connected. The particular user interface can be adapted to suit the particular application. A user can enter or attach text or other short messages through the user interface and can use the interface for system maintenance and control. For a MS, the user can, through the interface, make recordings with the microphone and camera and attach them to short messages that are commanded to be sent to a specific user or group of users using the keyboard or touch screen.

The processor 152 is coupled to another communications bus for communications with other devices. A wired interface 166 allows a BS to communicate with other BS's, gateways, base station controllers, operations and maintenance centers, etc. For the BS, the wired interface can allow for network connections and for a portable device, it may allow the device to be coupled to a personal computer for updates and maintenance. The communications bus also provides for wired or wireless connections to a personal area network (PAN) 168, such as Bluetooth, a local area network (LAN) 170 such as Wi-Fi, and a wide area network 172, or metropolitan area network such as 802.16m. More or fewer network adapters may be provided, depending on the application. Some network functions may be consolidated or separated, and a variety of different communications protocols and configurations may be used.

The wide area network (WAN) adapter 172 includes logic 174 to generate, assemble, encode, encrypt, and queue packets to be sent through the WAN. The logic is coupled to a transceiver 176 to modulate, encode, and amplify the packets from the logic for transmission through an antenna 178 over the WAN. The antenna may have one or more elements, depending on performance, cost and design considerations. The same transmit chain can also function as a receive chain or a separate receive chain (not shown) can be used. The receive chain would perform the reciprocal functions of receiving demodulating, amplifying, parsing, decoding, etc. to obtain data to send back to the processor over the communications bus.

In the case of receiving a packet with control messages, the messages are sent to the processor and are then used to adjust operation parameters or call routines for registration, call initiation, etc. In the case of receiving a packet with a user message, the message is sent to the processor and is then provided to the user on the display. In either case, the messages may be stored in memory.

The configuration of FIG. 7 can also be applied to a portable or desktop computer equipped with a wireless adapter. The WAN adapter 172 can be provided as a separate component on USB, a PCI (Peripheral Component Interconnect) bus, or any other suitable bus, or it can be provided as an internal system component.

A lesser or more equipped communications station 150 than the example described above may be desirable for certain implementations. Therefore, the configuration of the system will vary from implementation to implementation depending upon numerous factors, such as price constraints, performance requirements, technological improvements, and/or other circumstances.

Embodiments of the present invention have been described in the context of WiMAX and particular messages within that communications protocol and standard, however, the invention is not so limited. Embodiments of the present invention can be applied to other communications protocols and other types of control messages within WiMAX and other protocols, including 3GPP LTE, in order to allow mobile or subscriber stations to be handed over across various boundaries.

Similarly, embodiments of the invention have been described using terminology consistent with WiMAX architectures and protocols. However, the present description can also be understood as applicable to similar and equivalent devices and signals that use different names. For example, the term mobile station as used herein may instead, or in addition, be applied to an advanced mobile station, a subscriber station, a user station, a remote device, a subscriber unit, a mobile unit or similar device. The term base station may be applied to a base transceiver station, access point, wireless network node, relay or repeater station or similar device. The term gateway may be applied to a base station controller, switching center, wireless router, and similar devices. In addition, the description herein as applied to specific signaling protocols such as R4, R6, and R6-Flex, can also be applied to other signaling protocol between base stations and gateways and similar devices. The present invention can be adapted to work with variations and modifications of these protocols as well as other protocols that are used in other types of systems.

While the steps described herein can be performed under the control of a programmed processor, such as the processor 152, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general-purpose computer components or custom hardware components. Therefore, nothing disclosed herein should be construed as limiting the present invention to a particular embodiment wherein the recited steps are performed by a specific combination of hardware components.

The present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
   registering and connecting a mobile station to a first base station and a first gateway;
   handing the mobile station over to a second base station and connecting the mobile station to the second base station while the mobile station is registered to the first gateway, the second base station being coupled to the first gateway;
   selecting a second gateway coupled to the second base station;
   registering the mobile station to the second gateway while the mobile station is connected to the second base station;
   de-registering the mobile station from the first gateway after registering the mobile station to the second gateway; and
   handing the mobile station over to a third base station and connecting the mobile station to the third base station while the mobile station is registered to the second gateway, the third base station being coupled to the second gateway and not coupled to the first gateway.

2. The method of claim 1, wherein selecting the second gateway comprises sending a selection request message to the second gateway and receiving a selection response from the gateway.

3. The method of claim 1, wherein sending a selection request comprises sending the selection request from the second abase station to the second gateway though a direct connection between the second abase station and the second gateway.

4. The method of claim 1, wherein selecting the second gateway comprises selecting a second gateway that is in an access service network cluster different from an access service network cluster of the first gateway.

5. The method of claim 1, wherein selecting the second gateway comprises selecting a second gateway that is in an access service network cluster different from an access service network cluster of the first gateway and also in the access service network cluster of the first gateway.

6. The method of claim 1, further comprising transferring a context from the first gateway to the second gateway.

7. The method of claim 1, further comprising relocating a connection between the first gateway and a home agent to the second gateway.

8. The method of claim 1, wherein the home agent is a home agent of a connectivity services network that is common to both the first gateway and the second gateway.

9. The method of claim 1, further comprising deregistering the mobile station from the first gateway and registering the mobile station with the second gateway.

10. The method of claim 1, further comprising registering a data path from the second base station to the second gateway and deregistering a data path from the second base station to the first gateway.

11. An apparatus comprising:
a first cluster having a plurality of gateways;
a plurality of base stations coupled to the gateways, a first one of the base stations registering and connecting a mobile station to the first base station and a first gateway of the first cluster;
a second cluster having a plurality of gateways;
at least one common base station coupled to a gateway of the first cluster and to a gateway of the second cluster, the common base station receiving a handover of the mobile station from the first base station while the mobile station is registered to the first gateway, registering the mobile station to a second gateway of the second cluster, de-registering the mobile station from the first gateway; and
a third base station coupled to a gateway of the second cluster receiving a handover of the mobile station from the common base station while the mobile station is registered to the second gateway of the second cluster.

12. The apparatus of claim 11, wherein at least one of the plurality of gateways of the first cluster, is also a gateway of the second cluster.

13. The apparatus of claim 11, further comprising a direct data path connection between the common base station and each of the plurality of gateways of the first cluster and a direct data path between the common base station and the gateway of the second cluster.

14. The apparatus of claim 13, further comprising a direct data path connection between each of the plurality of base stations of the first cluster and each of the plurality of gateways of the first cluster.

15. The apparatus of claim 13, wherein the direct data path connection is a WiMAX R6-Flex connection.

16. An apparatus comprising:
a first cluster having a plurality of gateways;
a plurality of base stations coupled to the plurality of gateways of the first cluster, a first one of the base stations registering and connecting a mobile station to the first base station and a first gateway of the first cluster;
a second cluster having a second a plurality of gateways; and
a second gateway of the first cluster coupled to the second a base station of the first cluster and to a third base station of the second cluster, the second base station receiving a handover of the mobile station from the first base station while the mobile station is registered to the first gateway, registering the mobile station to a second gateway of the second cluster, de-registering the mobile station from the first gateway, and the third base station receiving a handover of the mobile station from the second base station while the mobile station is registered to the second gateway.

17. The apparatus of claim 16, wherein at least one of the plurality of base stations of the first cluster of the first gateways is also in the second cluster of gateways.

18. The apparatus of claim 16, further comprising a direct data path connection between the at least one gateway of the first cluster and each of the plurality of base stations and a direct data path between the at least one gateway and a base station of the second cluster.

19. The apparatus of claim 16, wherein the gateways of the first cluster and the second cluster are coupled to a common home agent for data communication outside the network.

20. The apparatus of claim 16, wherein the first plurality of gateways and the one gateway are coupled together for data communication.

* * * * *